(12) United States Patent
Dieringer et al.

(10) Patent No.: US 11,543,011 B2
(45) Date of Patent: Jan. 3, 2023

(54) MULTI-PIECE GEARWHEEL AND GEARBOX FOR A STEERING SYSTEM

(71) Applicant: TRW Automotive GmbH, Alfdorf (DE)

(72) Inventors: Rolf Dieringer, Dusseldorf (DE); Markus Beiss, Eschweiler (DE); Timm Leuerer, Neuss (DE); Leon Schroeder, Uedem (DE)

(73) Assignee: ZF Automotive Germany GmbH, Alfdorf (DE)

( * ) Notice: Subject to any disclaimer, the term of this patent is extended or adjusted under 35 U.S.C. 154(b) by 224 days.

(21) Appl. No.: 16/598,344

(22) Filed: Oct. 10, 2019

(65) Prior Publication Data
US 2020/0114948 A1 Apr. 16, 2020

(30) Foreign Application Priority Data
Oct. 15, 2018 (DE) .......................... 102018125537.3

(51) Int. Cl.
*F16H 55/17* (2006.01)
*B62D 5/04* (2006.01)
*F16H 55/08* (2006.01)
*F16H 55/06* (2006.01)

(52) U.S. Cl.
CPC .......... *F16H 55/17* (2013.01); *B62D 5/0409* (2013.01); *F16H 55/08* (2013.01); *F16H 2055/065* (2013.01); *F16H 2055/0866* (2013.01)

(58) Field of Classification Search
CPC .......... F16H 55/06; F16H 55/14; F16H 55/17; F16H 55/18; F16H 2055/065; F16H 2055/0866; F16H 2055/185; B29D 15/00; B29L 2015/003
USPC ........................... 74/434, 439, 440, 443, 446
See application file for complete search history.

(56) References Cited

U.S. PATENT DOCUMENTS

| | | | |
|---|---|---|---|
| 2,764,900 A * | 10/1956 | Warsmith | F16H 55/06 74/434 |
| 4,589,860 A * | 5/1986 | Brandenstein | F16H 55/06 474/152 |
| 9,127,764 B2 * | 9/2015 | Koike | A01K 89/015 |
| 9,670,557 B2 * | 6/2017 | Pedersen | C14B 17/02 |
| 9,868,459 B2 * | 1/2018 | Beyerlein | B62D 5/0409 |
| 2002/0043124 A1 * | 4/2002 | Shiga | B29D 15/00 74/434 |

(Continued)

FOREIGN PATENT DOCUMENTS

| | | |
|---|---|---|
| DE | 102012102777 A1 | 10/2013 |
| EP | 2549147 A1 | 1/2013 |

(Continued)

*Primary Examiner* — Joseph Brown
(74) *Attorney, Agent, or Firm* — Robert James Harwood

(57) ABSTRACT

A multi-piece gearwheel comprising an inner core section and an external toothed ring with external teething is presented. The core section has intermeshing teeth extending radially outwards, which have an undercut in cross-section in the radial direction. The toothed ring has recesses that originate from an inner side of the tooth ring and extend radially outwards, wherein the recesses are at least partially complementary to the intermeshing teeth, and wherein the intermeshing teeth are received in the recesses. Furthermore, a gearbox for an electromechanically-assisted steering system is described.

19 Claims, 7 Drawing Sheets

(a)

(b)            (c)

(56) References Cited

U.S. PATENT DOCUMENTS

| | | | |
|---|---|---|---|
| 2002/0178853 A1* | 12/2002 | Konishi | F16H 55/06 74/457 |
| 2008/0066993 A1* | 3/2008 | Kaneiwa | C08L 79/04 180/444 |
| 2008/0146402 A1* | 6/2008 | Shinohara | F16H 55/06 475/331 |
| 2008/0178697 A1* | 7/2008 | Imagaki | B62D 5/0409 74/388 PS |
| 2009/0282939 A1* | 11/2009 | Rogowski | F16H 55/06 74/424.5 |
| 2010/0031764 A1* | 2/2010 | Derse | F16H 55/14 74/457 |
| 2010/0051378 A1* | 3/2010 | Kurokawa | F16H 55/06 180/444 |
| 2012/0067151 A1* | 3/2012 | Kikuchi | F16H 55/06 74/425 |
| 2013/0047767 A1* | 2/2013 | Itani | F16H 55/06 74/439 |
| 2014/0083222 A1* | 3/2014 | Cleeves | F02B 75/282 74/421 R |
| 2014/0135160 A1* | 5/2014 | Kaiser | F16H 55/06 474/152 |
| 2016/0017976 A1* | 1/2016 | Iijima | B29C 45/1459 74/446 |
| 2016/0200004 A1* | 7/2016 | Ozawa | F16H 55/06 74/434 |
| 2017/0072992 A1* | 3/2017 | Schlegel | F16H 55/06 |
| 2017/0166239 A1* | 6/2017 | Kim | B62D 5/008 |
| 2017/0175870 A1* | 6/2017 | Park | F16H 55/06 |
| 2018/0017150 A1* | 1/2018 | Leupold | B33Y 10/00 |
| 2019/0093748 A1* | 3/2019 | Koop | B29C 37/0082 |
| 2020/0003292 A1* | 1/2020 | Crump | F16H 7/06 |
| 2020/0217406 A1* | 7/2020 | Jiang | F16H 55/17 |
| 2020/0248791 A1* | 8/2020 | Kobayashi | F16H 55/17 |
| 2021/0088112 A1* | 3/2021 | Kiyota | B29C 45/27 |

FOREIGN PATENT DOCUMENTS

| | | |
|---|---|---|
| JP | S58128563 A | 8/1983 |
| JP | 2004150518 A | 5/2004 |
| WO | 2013122282 A1 | 2/2013 |
| WO | WO-2017157697 A1 * | 9/2017 |

* cited by examiner

MULTI-PIECE GEARWHEEL AND GEARBOX FOR A STEERING SYSTEM

CROSS-REFERENCE TO RELATED APPLICATION

This application claims priority to German Patent Application No. 102018125537.3, filed 15 Oct. 2018, the disclosure of which is incorporated herein by reference in its entirety.

TECHNICAL FIELD

The present disclosure relates to a multi-piece gearwheel comprising an inner core section and an external toothed ring with external toothing, as well as a gearbox for an electromechanically-assisted steering system comprising such a multi-piece gearwheel.

Multi-piece gearwheels are known in different variants according to the prior art. Typically, an external toothing of the core section meshes with an internal toothing of the external toothed ring to transfer forces acting in the circumferential direction of the gearwheel between the outer toothed ring and the core section. Such multi-piece gearwheels are used for example in steering gears, especially in worm gears for electromechanically-assisted steering systems, in which an auxiliary force of an electric motor is transmitted via the gear to a steering column of the steering system.

In a power transmission between the outer toothed ring and the core section, large tensile stresses on the outer toothed ring may occur, which act in the circumferential direction. Furthermore, it may happen that the outer toothed ring is partially disengaged from the core section by the transmitted forces, in which additional tensile stresses act on the toothed ring. The tensile stresses, especially on the outer toothed, lead to material fatigue, and then, to a shorter life of the gearwheel.

SUMMARY

Therefore, the purpose of the present disclosure is to provide a multi-piece gearwheel and a gearbox for an electromechanically-assisted steering system, in which the disadvantages according to the prior art are eliminated.

The core section of the multi-piece gearwheel has intermeshing teeth extending radially outwards, which in cross-section have an undercut in the radial direction. The toothed ring has recesses, which originate from an inner side of the toothed ring and extend radially outwards, wherein the recesses are at least partially complementary to the intermeshing teeth, and wherein the intermeshing teeth are received in the recesses.

By "at least partially complementary" is to be understood hereinafter that the relevant recesses of the corresponding intermeshing teeth that are associated with such relevant recesses are at least partially filled, preferably completely filled. An outer surface of the intermeshing teeth is at least partially located directly on an inner surface of the recesses, preferably wherein the entire outer surface of the intermeshing teeth directly limits with the inner surface of the recesses.

The cross-section of the intermeshing teeth is defined in a radial plane perpendicular to the axial direction of the gear and extends through the gear.

Since the intermeshing teeth have an undercut, the outer toothed ring and the inner core section are positively connected by the intermeshing teeth, both in the radial direction and also in the circumferential direction of the gearwheel. The undercut in the radial direction means that there is a lateral indentation moving radially from the outside to the inside, i.e. an indentation in the circumferential direction, which constitutes an undercut in the radial direction. Thus, a direct force transmission is ensured between the outer toothed ring and the inner portion, in particular in the circumferential direction of the gearwheel, and it is prevented with absolute reliability that the toothed ring disengages from the core section between the toothed ring and the core section when a force is being transmitted. Accordingly, tensile stresses acting on the toothed ring are reduced and the service life of the gearwheel is significantly increased.

In this case it is not necessary that all intermeshing teeth have the same shape. In fact, the intermeshing teeth may have different cross-sections.

When referring to a multi-piece gearwheel, for example, it means a gearwheel which is inserted into a steering gear, particularly into a worm gear for electro-mechanically assisted steering systems, which are also referred to as EPS steering systems.

Preferably, the intermeshing teeth are each substantially arranged in the circumferential direction centrally and radially inwards relative to an associated tooth or a tooth gap of the toothed ring. In other words, seen in the radial direction of the gearwheel, the respective intermeshing tooth and its associated tooth or the associated tooth gap of the toothed ring are located in a row. Accordingly, a force acting on the respective tooth is transmitted directly via the intermeshing tooth, which is associated with the respective tooth, and/or via the intermeshing teeth, which are associated with the tooth gaps adjacent to the respective tooth, in a manner that the power transmission between the toothed ring and the core section is significantly improved.

More preferably, the number of intermeshing teeth is twice as large as the number of teeth of the external toothing. Therefore, each tooth and each tooth gap of the toothed ring is respectively associated with an intermeshing tooth. The power transmission between the toothed ring and the core section, therefore, takes place particularly in a uniform manner.

In accordance with one embodiment of the present disclosure, it is provided that those intermeshing teeth, which are arranged radially inwards relative to a tooth, and those intermeshing teeth, which are arranged radially inwards relative to a tooth gap, extend differently far in the radial direction, in particular wherein at least one of the intermeshing teeth, which is arranged radially inwards relative to a tooth extends in the radial direction into the corresponding tooth. Preferably, all intermeshing teeth that are arranged radially inwards relative to a tooth, that is, that are associated with a tooth, extend into the corresponding tooth in a manner that an optimal power transmission between the toothed ring and the core section is ensured. The tooth tips thus mesh with the toothed ring on radially different diameters.

According to one aspect of the present disclosure, the respective cross-section of the intermeshing teeth tapers starting from the core section first and then widens again to form the undercut. In other words, the intermeshing teeth, seen in the axial direction of the gearwheel, extending from the core section in the radial direction, become initially narrower and then wider again, so that the undercut is formed.

In particular, the cross-section of the intermeshing teeth in an axial view is formed substantially by a conical trapezoid tapered radially outwards, to whose radial end an elliptical segment is connected. In this case, the trapezoid passes directly into the elliptical segment, in a manner that no gaps are formed. In particular, the elliptical segment is a circular segment. "Substantially" means here that even minor deviations of this shape are possible. For example, the cross-section of the intermeshing teeth may each have the shape of a bowling spin in the axial view. However, the intermeshing teeth may also have any other suitable shape, which has an undercut in cross-section in the radial direction.

Preferably, a plurality of rows of intermeshing teeth are provided, which are connected to each other in the axial direction of the gearwheel, in particular wherein three rows are provided. The intermeshing teeth of the individual rows have preferably the same position in relation to the circumferential direction of the gearwheel, but may also have different positions, that is, may be offset from each other in the circumferential direction.

Furthermore, the intermeshing teeth may partially have a multi row axial arrangement in relation to the circumferential direction and/or may be partially formed in a continuous manner in axial direction. Thus, the core section may have areas extending in the circumferential direction, where a plurality of rows of intermeshing teeth are provided, which are connected to each other in the axial direction of the gearwheel. Furthermore, the core section may have areas extending in the circumferential direction, where at least one intermeshing tooth extends over the entire axial length of the core section. In particular, the different areas of the core section alternate in the circumferential direction.

The height of the radial extension of at least one of the rows, that is, the tooth heights in these rows, may differ from the height of the radial extension of the other rows. For that reason, the core section and the toothed ring as viewed in the axial direction of the gearwheel, at least in one direction, are positively connected with each other.

More preferably, the core section has three rows of intermeshing teeth, wherein at least one intermeshing tooth of the middle row has a larger radial extension than the intermeshing teeth of the two outer rows. Preferably, a plurality of intermeshing teeth with a larger radial extension of the middle ring are distributed on the circumference. Accordingly, the core section and the toothed ring are positively connected to each other in the axial direction of the gearwheel. Preferably, several or all the intermeshing teeth of the middle row have a larger radial extension than the intermeshing teeth of the outer rows.

Of course, the same principle is also possible with more than three rows of intermeshing teeth. In this case, at least one intermeshing tooth (preferably all intermeshing teeth) of the non-outer rows in the axial direction has a larger radial extension than the intermeshing teeth of the two outer rows.

Another aspect provides that at least one of the intermeshing teeth, preferably a plurality of intermeshing teeth spaced from each other in circular direction, extends/extend only over a portion of the axial extension of the core section and/or has/have an undercut in the longitudinal section in the axial direction. In other words, even a series of intermeshing teeth may be provided, wherein one or more of the intermeshing teeth each extend only over a portion of the axial extension of the core section, in particular wherein the portion is contiguous and does not include the axial edges of the core section. Outside this portion, therefore, no intermeshing teeth are provided. The toothed ring is connected there directly to the core section and comprises the intermeshing teeth at their axial ends. Therefore, the core section and/or the intermeshing teeth have an undercut in the axial direction of the gearwheel, by means of which the core section and the toothed ring are positively connected to each other in the axial direction of the gearwheel.

It may be provided that such intermeshing teeth extending substantially over the entire axial extension of the core section, and such intermeshing teeth extending only over a portion of the axial extension of the core section, alternate in the circumferential direction.

Preferably, all intermeshing teeth extend over at least 50% of the axial extension of the core section, more preferably over at least 60%, in particular over at least 70%. Thus, a reliable power transmission between the toothed ring and the core section is ensured.

Specifically, the intermeshing teeth that only extend over a portion of the axial extension of the core section, are respectively associated with a tooth, while the intermeshing teeth that extend substantially over the entire axial extension of the core section, are respectively associated with a tooth gap.

According to a further aspect of the present disclosure, the core section has transmission teeth, whose cross-section differs from the cross-sections of the intermeshing teeth, in particular wherein the transmission teeth are designed without undercuts. The transmission teeth only transmit a force acting in the circumferential direction between the toothed ring and the core section, that is, in particular there are no forces acting radially. Then, the transmission teeth can have any tooth shape, as is known from gearwheels according to the prior art.

As described above, a plurality of rows of intermeshing teeth are provided, which are connected to each other in the axial direction of the gearwheel. Preferably the transmission teeth are arranged in one of the inner rows in relation to the axial direction, but not in one of the outer rows.

According to one embodiment of the present disclosure it is provided that the transmission teeth alternate with the intermeshing teeth in the circumferential direction of the core section, or that groups of transmission teeth alternate with groups of intermeshing teeth.

According to a further aspect of the present disclosure, the core section is made of a different material than the toothed ring, in particular wherein the material of the toothed ring has a smaller modulus of elasticity than the material of the core section. For example, the core section is made of a fiber-reinforced thermoplastic and the toothed ring is made of a thermoplastic without fiber reinforcement. Alternatively, the core section may be made of a metal and the toothed ring may be made of a thermoplastic. However, any other suitable material combination is possible. Preferably, the toothed ring is integrally pre-formed directly on the core section, in particular by an injection-molded process.

The core section may have an inner ring and an outer ring, wherein the intermeshing teeth are mounted on the outer ring, and wherein the inner and the outer ring are interconnected by struts and/or by a half-timbered construction. This reduces the weight of the core section and also of the entire gearwheel, while maintaining the stability of the gearwheel.

In particular, the inner ring of the core section has an inner toothing for connecting the gearwheel with a shaft. However, the gearwheel can also be connected in any other suitable manner with the shaft, for example by means of feather keys, connecting pins, or by means of a press fit.

The purpose is further achieved according to the present disclosure via a gearbox for an electric power steering system, with at Fast one gearwheel as described above, in particular wherein the gearbox is designed as a worm gear or a spur gear. The gearwheel is engaged in particular with a worm shaft or a spur gear of the gearbox. For example, the gearbox is used in a steering system with steering column support, which is also known in English as "EPS column drive". Alternatively, the gearbox can also be used in an electromechanically-assisted steering system with a pinion drive (English: "pinion drive EPS") or in an electromechanically-assisted steering system with a dual pinion (English: "dual pinion EPS").

The worm shaft or the spur gear is then connected to an electric motor of the steering system. The gearwheel is mounted on a steering column of the steering system or connected to a pinion for transmitting torque, which meshes with a rack of the steering system in a manner that, via the gearbox, an auxiliary force provided by the electric motor is transmitted to the steering column or directly to the rack.

The purpose is also achieved according to the present disclosure by an electromechanically-assisted steering system for a motor vehicle, comprising at least one gearbox as described above. In particular, the steering system comprises a steering column support, a pinion drive or a dual pinion.

In steering systems with a dual pinion, the auxiliary drive is typically installed in the engine compartment, where higher requirements for the resistance of the individual components in terms of temperature level and temperature fluctuations are present. In addition, the torques to be transmitted are typically greater than in comparable steering systems with a steering column support. The two-piece gearwheel according to the present disclosure is particularly suitable for these requirements, since it includes an improved power transmission and a longer service life than previously known gears, as explained above. With regard to the other benefits, please refer to the above explanations.

BRIEF DESCRIPTION OF THE DRAWINGS

Further advantages and features will become apparent from the following description and the accompanying drawings to which reference is made. In which are shown.

DETAILED DESCRIPTION

Figure 1A:
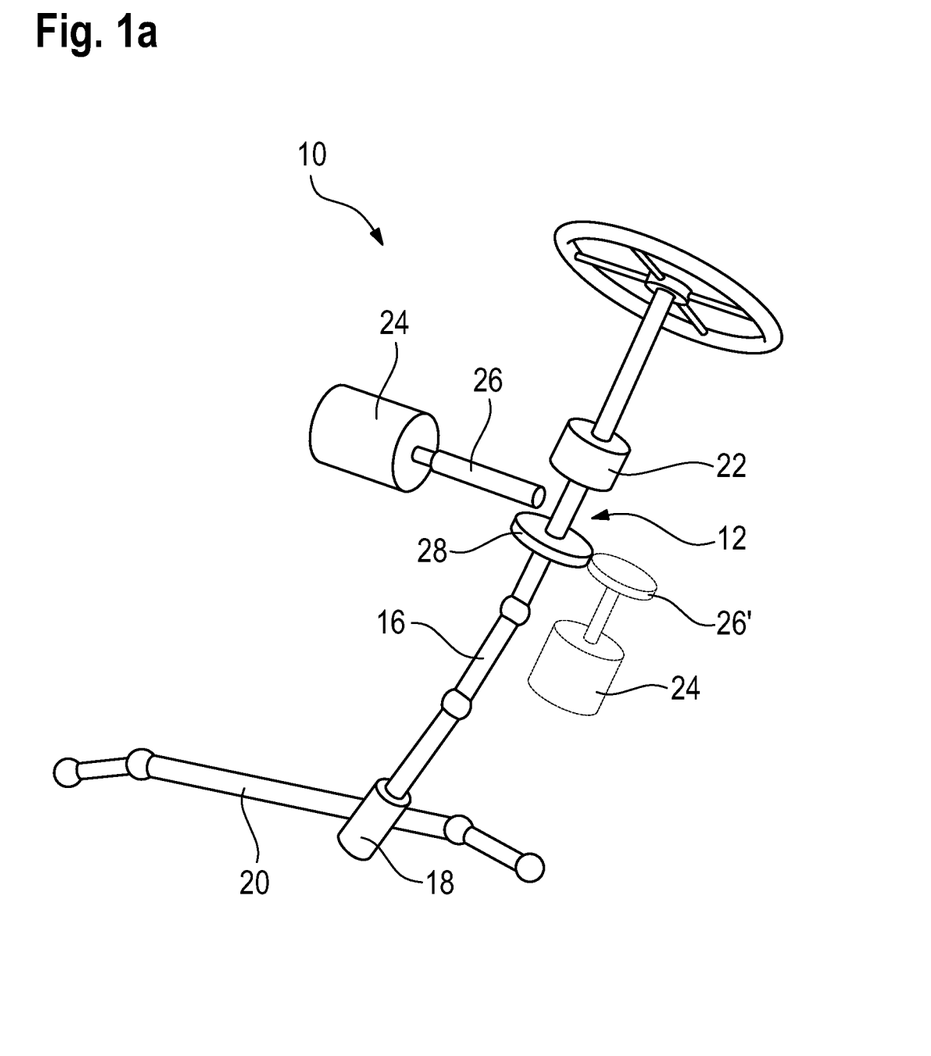
FIG. 1(a) is a first embodiment of an electromechanically-assisted steering system with a gearbox according to the present disclosure.

In FIG. 1(a) a steering system 10 is schematically shown with a gearbox 12, which is designed as an electromechanically-assisted steering system with steering column support (English: "EPS column drive").

The steering system 10 has a steering wheel 14, which is connected via a steering shaft 16 with a first pinion 18. The first pinion 18 meshes with a rack 20 in a manner that said rack is acted on by a manually applied steering torque on the steering wheel 14. A steering sensor 22 is arranged on the steering shaft 16, which detects steering movements and is adapted to measure steering torques and/or steering angle. Furthermore, an electric motor 24 is provided, which is connected to the gearbox 12 for transmitting torque.

In the embodiment shown, the gearbox 12 is formed as a worm gear. More specifically, the gearbox 12 has a worm shaft 26 that is connected to the electric motor 24 for transmitting torque. The worm gear 12 also comprises a multi-piece gearwheel 28, which is mounted to the steering shaft 16, in particular rotatably mounted, and meshes with the worm shaft 26 (in FIG. 1 only for better Illustration of the individual components, the worm shaft 26 and the multi-piece gearwheel 28 are shown spaced from each other). The multi-piece gearwheel 28 is formed here as a multi-piece worm gear.

As indicated in FIG. 1(a) by the dashed lines, the gearbox 12 may also be formed as a spur gear. The gearbox 12 has instead of the worm shaft 26, a spur gear 26', which is connected to the electric; motor 24 for transmitting torque and which meshes with the multi-piece gearwheel 28. Via the gearbox 12 an auxiliary force provided by the electric motor 24 is transmitted in both cases to support a steering movement on the steering shaft 16.

Figure 1B:
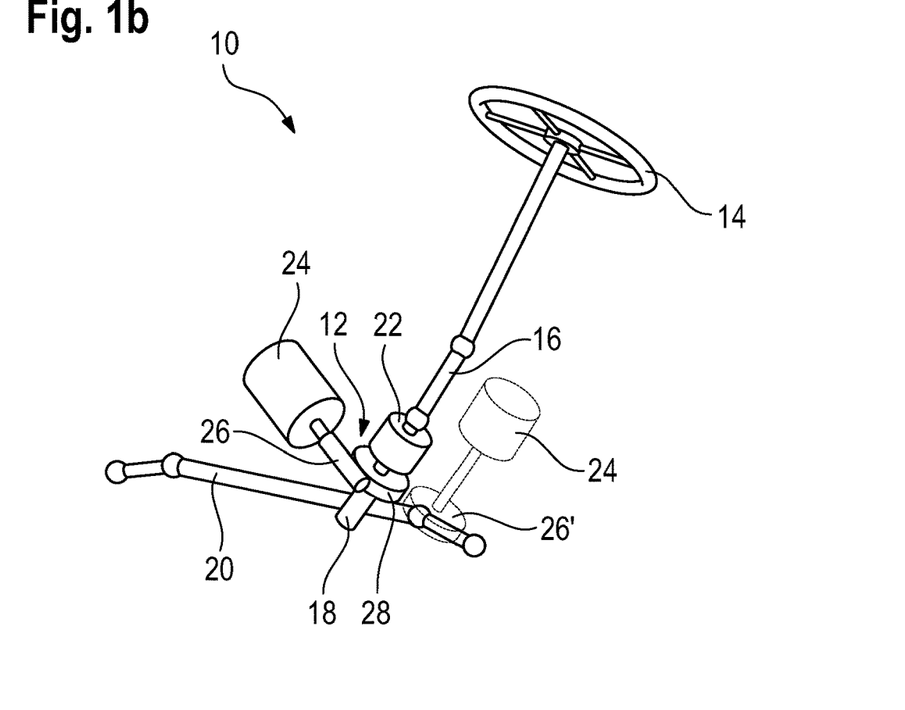
FIG. 1(b) is a second embodiment of an electromechanically-assisted steering system with a gearbox according to the present disclosure.

The steering system 10 shown in FIG. 1(b) differs from that shown in FIG. 1(a) in that the electric motor 24 is not connected to the steering shaft 16, but to the first pinion 18 via the gearbox 12 for torque transmission. The steering system 10 has a simple pinion drive, which is also referred to in English as "pinion drive EPS".

Figure 1C:
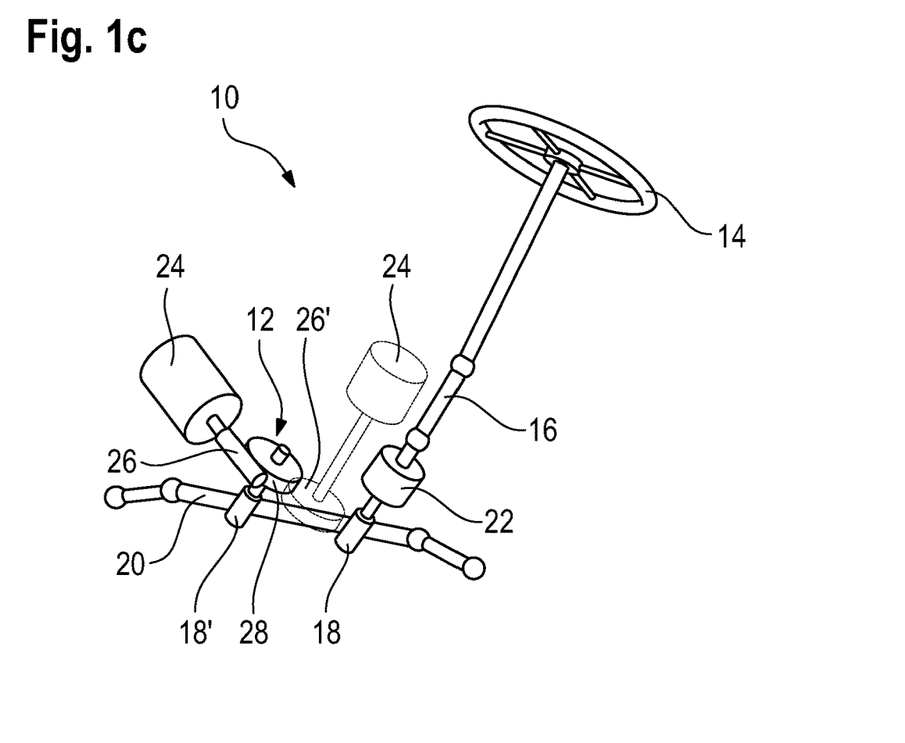
FIG. 1(c) is a third embodiment of an electromechanically-assisted steering system with a gearbox according to the present disclosure.

The steering system 10 shown in FIG. 1(c) has a second pinion 18'; which meshes with the rack 20 and is spaced from the first pinion 18. The electric motor 24 is connected via the gearbox 12 to the second pinion 18' to transmit torque. In this case, the steering system 10 is a steering system with dual pinion, which is also referred to in English as "dual pinion EPS".

Figure 2:
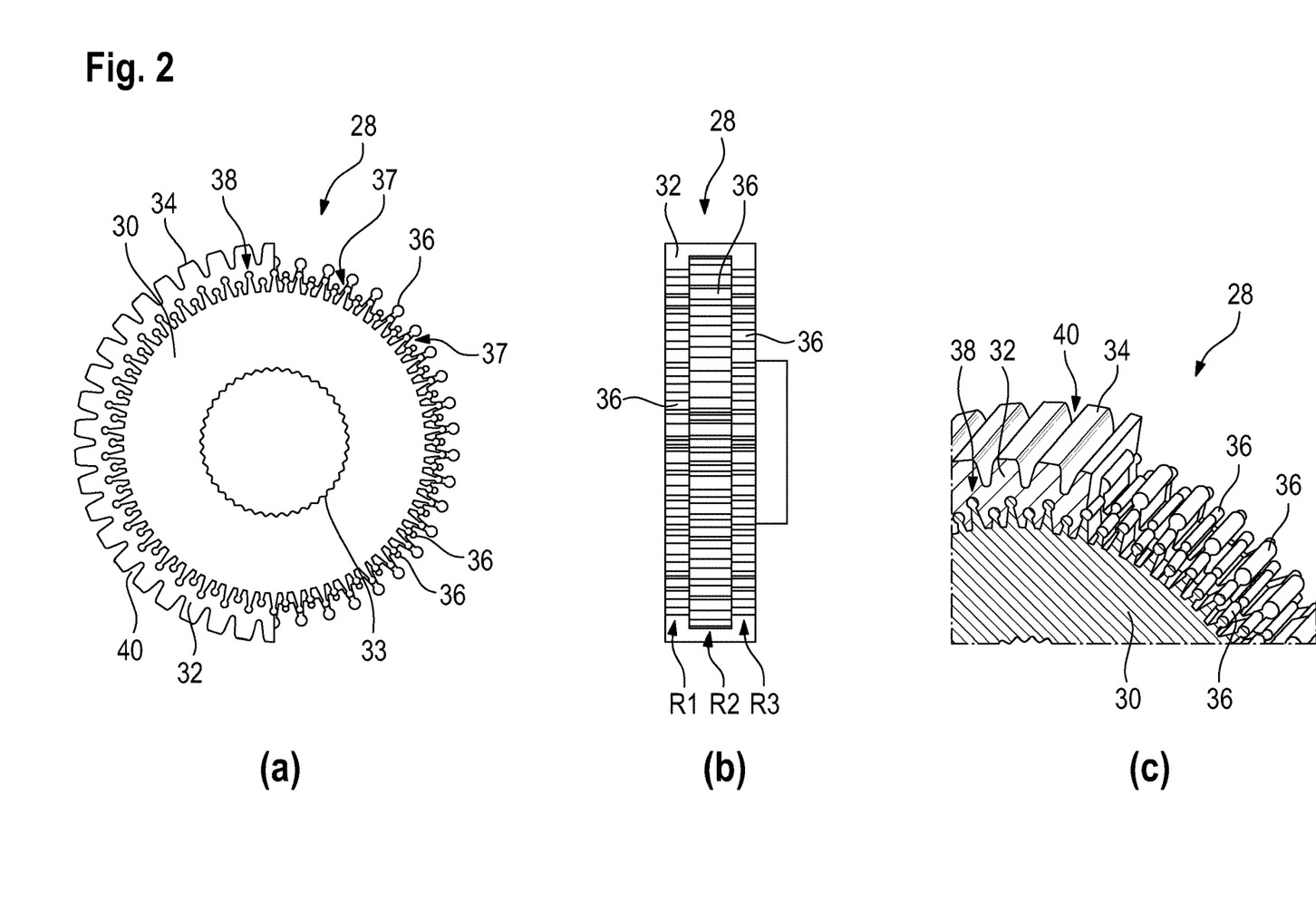
FIG. 2(a) is a front view of a gearwheel according to the present disclosure and according to a first embodiment.
FIG. 2(b) is a side view of a gearwheel according to the present disclosure and according to a first embodiment.
FIG. 2(c) is a partial, expanded view of a gearwheel according to the present disclosure and according to a first embodiment.
Figure 3:
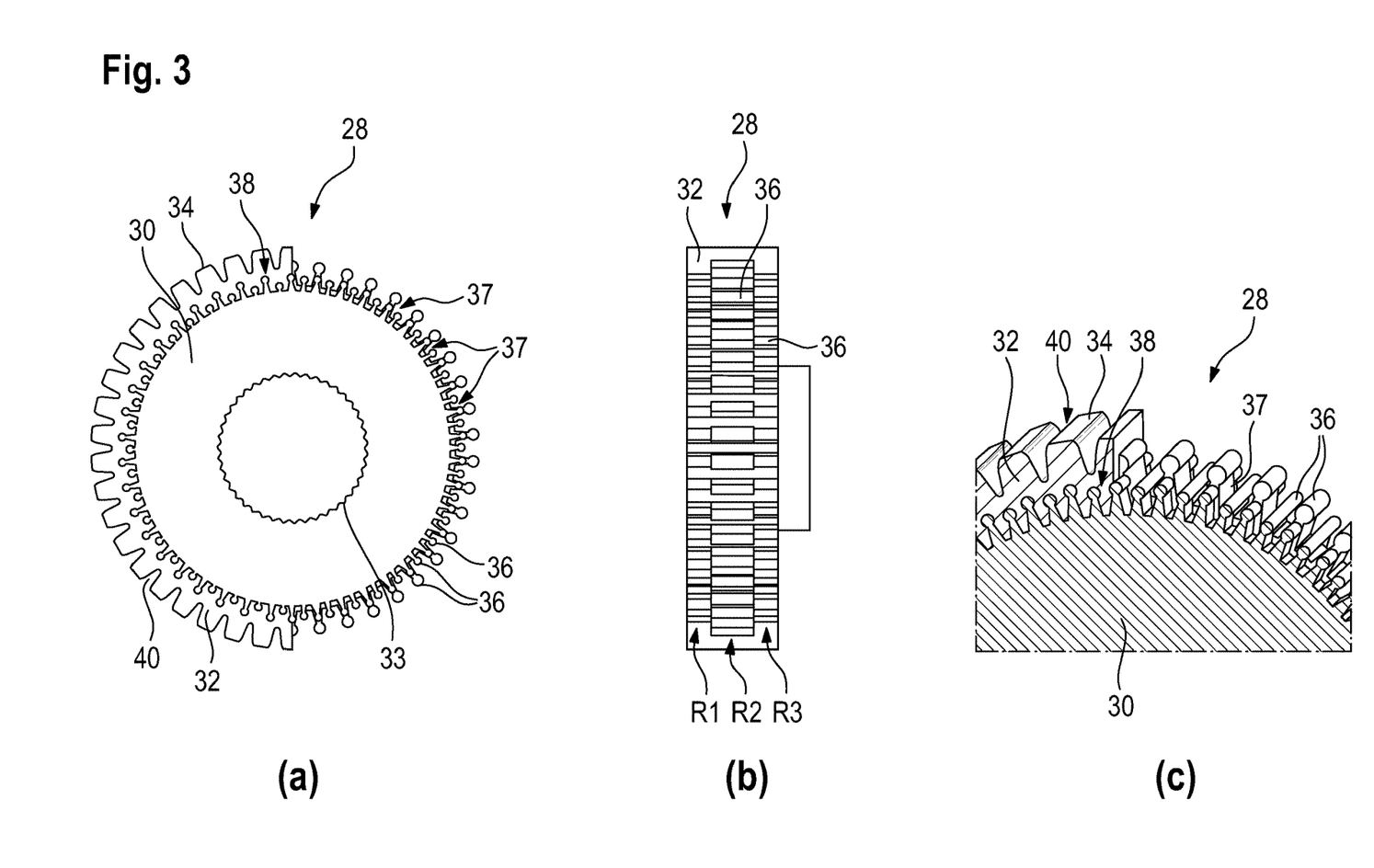
FIG. 3(a) is a front view of a gearwheel according to the present disclosure and according to a second embodiment.
FIG. 3(b) is a side view of a gearwheel according to the present disclosure and according to a second embodiment.
FIG. 3(c) is a partial, expanded view of a gearwheel according to the present disclosure and according to a second embodiment.
Figure 4:
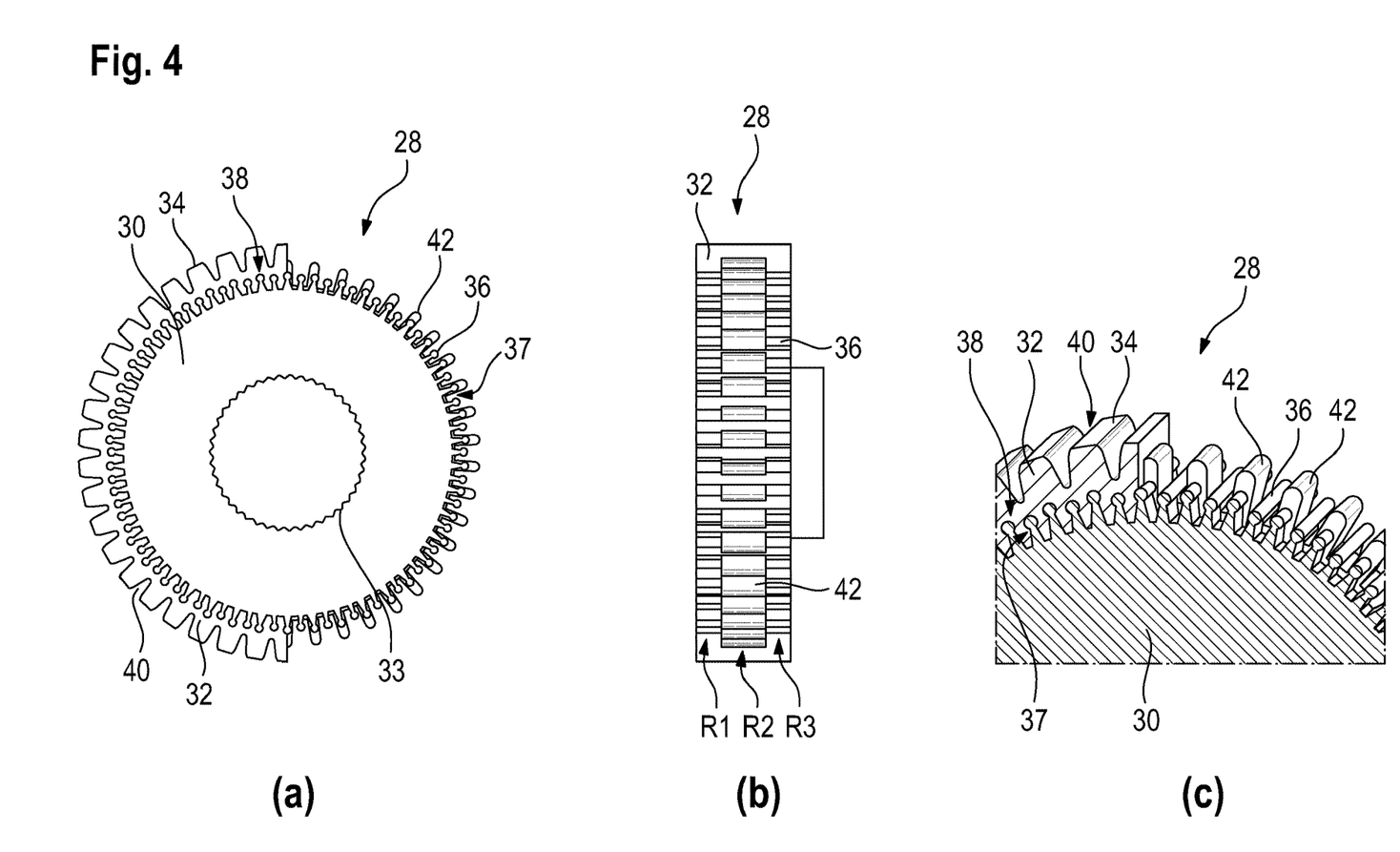
FIG. 4(a) is a front view of a gearwheel according to the present disclosure and according to a third embodiment.
FIG. 4(b) is a side view of a gearwheel according to the present disclosure and according to a third embodiment.
FIG. 4(c) is a partial, expanded view of a gearwheel according to the present disclosure and according to a third embodiment.

With reference to FIGS. 2 to 4, various embodiments of the multi-piece gearwheel 28 will be explained below in more detail, wherein components that substantially have a similar function, were given identical reference numerals.

FIGS. 2 (a) to (c) show a first embodiment of the multi-piece gearwheel 28 in an axial view, in a side view and in an oblique view.

The multi-piece gearwheel 28 has a preferably one-piece, inner core section 30 and also preferably a one-piece toothed ring 32, comprising an external toothing with teeth 34. In FIGS. 2 (a) to (c) only a part of the outer toothed ring 32 is shown for illustration purposes, respectively. However, the toothed ring 32 extends naturally in the circumferential direction of the gearwheel 28 over the entire core section 30.

The core section 30 and the toothed ring 32 are made of different materials; wherein the material of the toothed ring 32 has a lower modulus of elasticity than the material of the core section 30. For example, the core section 30 is made of a fiber reinforced thermoplastic, and the toothed ring 32 is made of thermoplastic without fiber reinforcement. Alternatively, the core section 30 may be made of a metal and the toothed ring 32 of a thermoplastic. However, any other suitable material combination is possible.

The core section 30 has an internal toothing 33, by means of which the gearwheel 28 can be mounted on a shaft, in particular as described above on the steering shaft 16. The internal toothing 33 and the core section 30 may be manufactured as a single piece, and in the process the same material will be used, accordingly. Alternatively, the internal toothing 33 may also be made of another material, for example, metal, and/or subsequently, Et may be mounted on the core section 30. However, the gearwheel 28 can also be connected in any other suitable manner with the shaft, for example by means of feather keys, connecting pins, or by means of a press fit.

It should be noted that the core section 30 is shown here as a solid component, but other embodiments of the core section 30 are also possible. Thus, the core section 30 may for example comprise an inner ring with the inner toothing 33 and an outer ring, which are connected to each other by struts and/or by a half-timbered construction.

The core section 30 and the toothed ring 32 are connected to each other in a positive lock manner via intermeshing teeth 36 extending from the core section 30 radially outwards and being received into recesses 38 in the toothed ring 32. Such recesses extend from an inner side of the toothed ring 32 radially outwards, and are designed in a complementary manner with respect to the corresponding intermeshing tooth 36.

By a special design of the intermeshing teeth 36, which is explained in more detail below, the core section 30 and the gear ring 32 are positively connected to each other both in the axial direction of the gearwheel 28 and in the circumferential direction of the gearwheel 28, and also in the radial direction of the gearwheel 28.

The intermeshing teeth 36 have an undercut 37 in cross-section in the radial direction of the gearwheel 28 in a manner that the core section 30 and the toothed ring 32 are positively connected to each other in the radial direction. In addition, the core section 30 and the toothed ring 32 are positively connected to each other in the circumferential direction, since the recesses 38 are complementary to the Intermeshing teeth 36. The cross-section of the intermeshing teeth 36 is defined in a radial plane that is perpendicular to the axial direction of the gearwheel 28 and extends through the gearwheel 28. The radial undercut 37 is formed in the embodiment shown in FIG. 2 in a manner that the respective cross-section of the intermeshing teeth 36 is tapered from the core section 30 and then is widened again circumferentially.

As can be seen in FIG. 2, the cross-section of the Intermeshing teeth 36 in an axial view is formed substantially by a conical trapezoid tapered radially outwards, to whose radial end an elliptical segment is connected. In this case, the trapezoid passes directly into the elliptical segment in a manner that no gaps are formed. In particular, the elliptical segment is a circular segment. "Substantially" means here that even minor deviations of this shape are possible. For example, the cross-section of the intermeshing teeth may each have the shape of a bowling spin in the axial view.

The intermeshing teeth 36 are arranged in the circumferential direction on the core section 30 in a manner that exactly one intermeshing tooth 36 is associated with each tooth 34 of the outer toothing respectively, and in a manner that exactly one intermeshing tooth 36 is associated with each tooth gap 40 of the outer toothing respectively. Thus, there are provided twice as many intermeshing teeth 36 as there are teeth 34 of the external toothing. The intermeshing teeth 36 are respectively arranged in the circumferential direction centrally and radially inwards relative to the associated tooth 34 or to the associated tooth gap 40. Furthermore, those intermeshing teeth 36 that are arranged radially on the inner side of a tooth 34 extend in the radial direction more outwards than those intermeshing teeth 36 that are arranged radially on the inner side of a tooth gap 40.

In the embodiment shown in FIG. 2, three rows R1, R2, R3 of intermeshing teeth 36 are provided, which are connected to each other in the axial direction of the gearwheel 28. The two outer rows with respect to the axial direction R1 and R3 are identical here, that is, their respective intermeshing teeth 36 have the same position with respect to the circumferential direction, and also have the same extension and geometry with respect to the radial direction and the axial direction.

The intermeshing teeth 36 of the middle row R2 with respect to the axial direction have in the circumferential direction the same position as the corresponding intermeshing teeth 36 of the two rows R1 and R3, but differ in terms of the amount of the radial extension, i.e., the tooth height. More specifically, the intermeshing teeth 36 of the middle row R2 extend in the radial direction more outwards than the corresponding intermeshing teeth 36 of the two rows R1 and R3 having the same position in the circumferential direction.

Accordingly, a level is formed between the row R1 and the row R2 and between the row R2 and the row R3 in a manner that that the core section 30 and the gear ring 32 are positively connected to each other in the axial direction of the gearwheel 28. Alternatively or additionally, the intermeshing teeth 36 also in their axial extension can differ from the intermeshing teeth 36 of the two rows R1 and R3, in particular wherein the intermeshing teeth 36 of the middle row R2, have a larger axial extension (width) than the intermeshing teeth 36 of the two rows R1 and R3.

FIGS. 3(a) to (c) show a second embodiment of the multi-piece gearwheel 28 in an axial view, in a side view or in an oblique view, in which only the differences from the first embodiment are explained below. The embodiment shown in FIG. 3 of the gearwheel 28 differs from the embodiment shown in FIG. 2 of the gearwheel 28 only in that those intermeshing teeth 36 that are arranged radially on the inner side of one of the tooth gaps 40 extend over the entire axial length of the core section 30. In this embodiment, therefore, the above-described axial structure having three rows is provided only at those intermeshing teeth 36 that are arranged radially on the inner side of a tooth 34.

In other words, three adjacent intermeshing teeth 36 in the axial direction respectively extend under one tooth 34, wherein the middle intermeshing tooth 36 has a larger radial extension (tooth height) than the two outer intermeshing teeth 36. A single intermeshing tooth 36 extends, however, along the entire axial extension of the core section 30 under one tooth gap 40. Thus, axially continuous intermeshing teeth 36 in the circumferential direction alternate with intermeshing teeth 36 arranged in three rows in the axial direction.

FIGS. 4(a) to (c) show a third embodiment of the multi-piece gearwheel 28 in an axial view, in a side view or in an oblique view, in which only the differences from the second embodiment are explained below. The embodiment shown in FIG. 4 of the gearwheel 28 differs from the embodiment shown in FIG. 3 of the gearwheel 28 only in that those intermeshing teeth 36 that are arranged radially on the inner side of one of the teeth 34 in the middle row R2 are replaced by transmission teeth 42. Thus, at least in one area of the axial extension of the middle row R2 transmission teeth 42 alternate with intermeshing teeth 36 in the circumferential direction of the core section 30. The cross-section of the transmission teeth 42 differs from the cross-sections of the intermeshing teeth 36, at least in a manner that the transmission teeth are designed without undercuts. Therefore, the transmission teeth 42 transmit only a force acting in the circumferential direction between the toothed ring 32 and the core section 30, that is, in particular, no forces acting radially are present. The transmission teeth 42 may have any tooth shape, which is known from gears according to the prior art.

In order to guarantee optimal power transmission, the transmission teeth 42 in a similar manner to the intermeshing teeth 36 are also received in corresponding recesses 38 in the toothed ring 32, wherein the recesses 38 associated with the transmission teeth 42 are substantially complementary to the transmission teeth 42.

In FIGS. 5(a) to (c), a fourth embodiment of the gearwheel 28 is shown in an axial view, in a side view or in an oblique view. In this embodiment, only a number of intermeshing teeth (36) is provided. A plurality of intermeshing teeth 36 extend respectively only over a portion of the axial extension of the core section 30, wherein the portion is continuous and does not include the axial edges of the core section 30. In other words, these intermeshing teeth 36 extend in a middle area of the axial extension of the core section 30.

With respect to the circumferential direction outside this portion no intermeshing teeth 36 are at least partially provided. The toothed ring 32 connects there directly to the core section and includes the Intermeshing teeth 36 at their axial ends. Therefore, the core section 30 in longitudinal section has an undercut 44 in the axial direction of the gearwheel 28, by means of which the core section 30 and the toothed ring 32 are positively connected to each other in the axial direction of the gearwheel 28.

Figure 5:
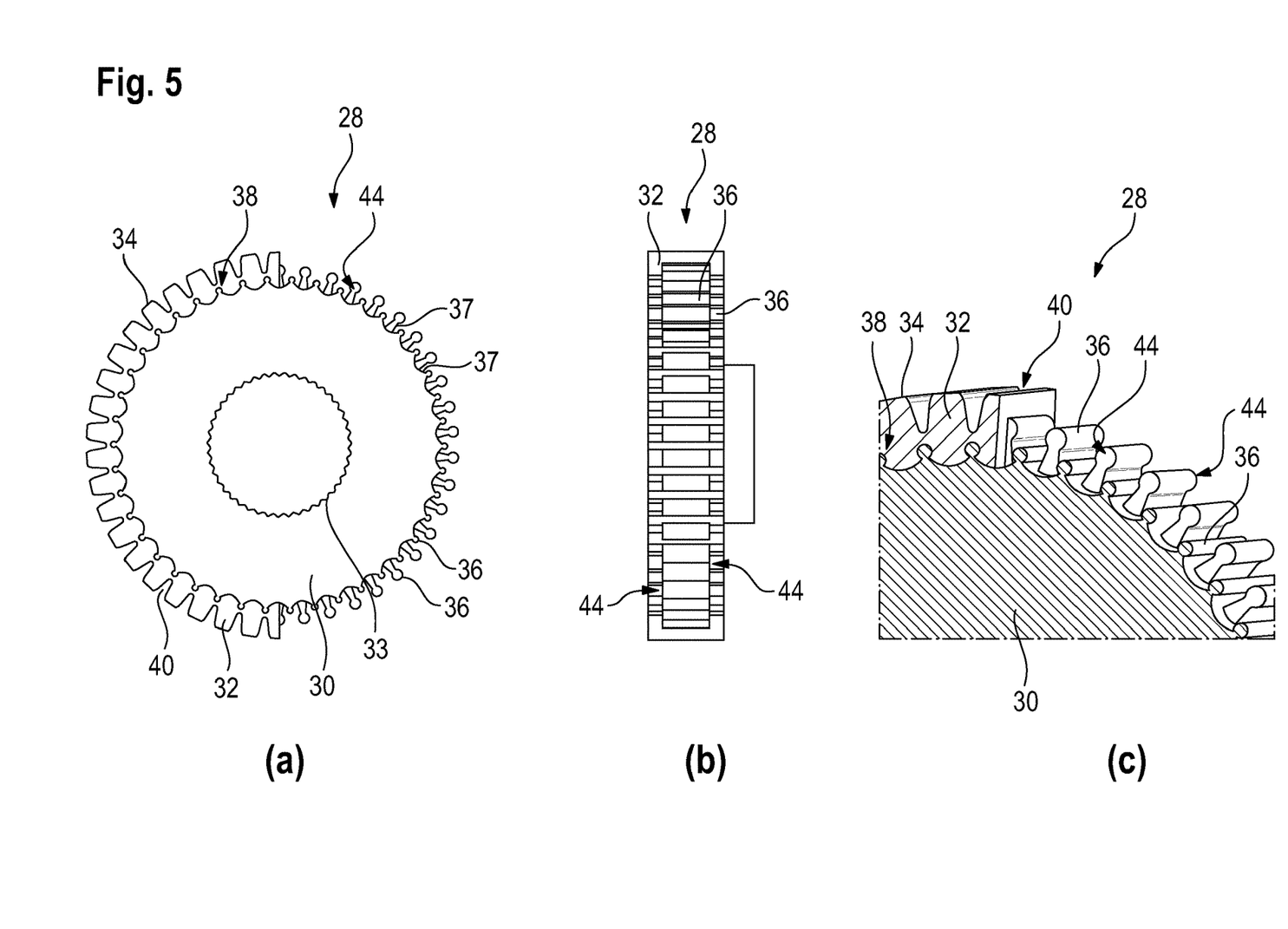
FIG. 5(a) is a front view of a gearwheel according to the present disclosure and according to a fourth embodiment.
FIG. 5(b) is a side view of a gearwheel according to the present disclosure and according to a fourth embodiment.
FIG. 5(c) is a partial, expanded view of a gearwheel according to the present disclosure and according to a fourth embodiment.

As can be clearly seen in FIG. 5, such intermeshing teeth 36 extending substantially over the entire axial extent of the core section 30, alternate in the circumferential direction with such intermeshing teeth 36 extending only over a portion of the axial extension of the core section 30.

As a result, the intermeshing teeth 36 extending only over a portion of the axial extension of the core section 30 are respectively associated with a tooth 34, while the intermeshing teeth 36 extending substantially over the entire axial extension of the core section 30 are respectively associated with a tooth gap 40. Preferably, all intermeshing teeth 36 extend over at least 50% of the axial extension of the core section 30, more preferably over at least 60%, in particular over at least 70%. Thus, a reliable power transmission between the toothed ring 32 and the core section 30 is ensured.

Figure 6:
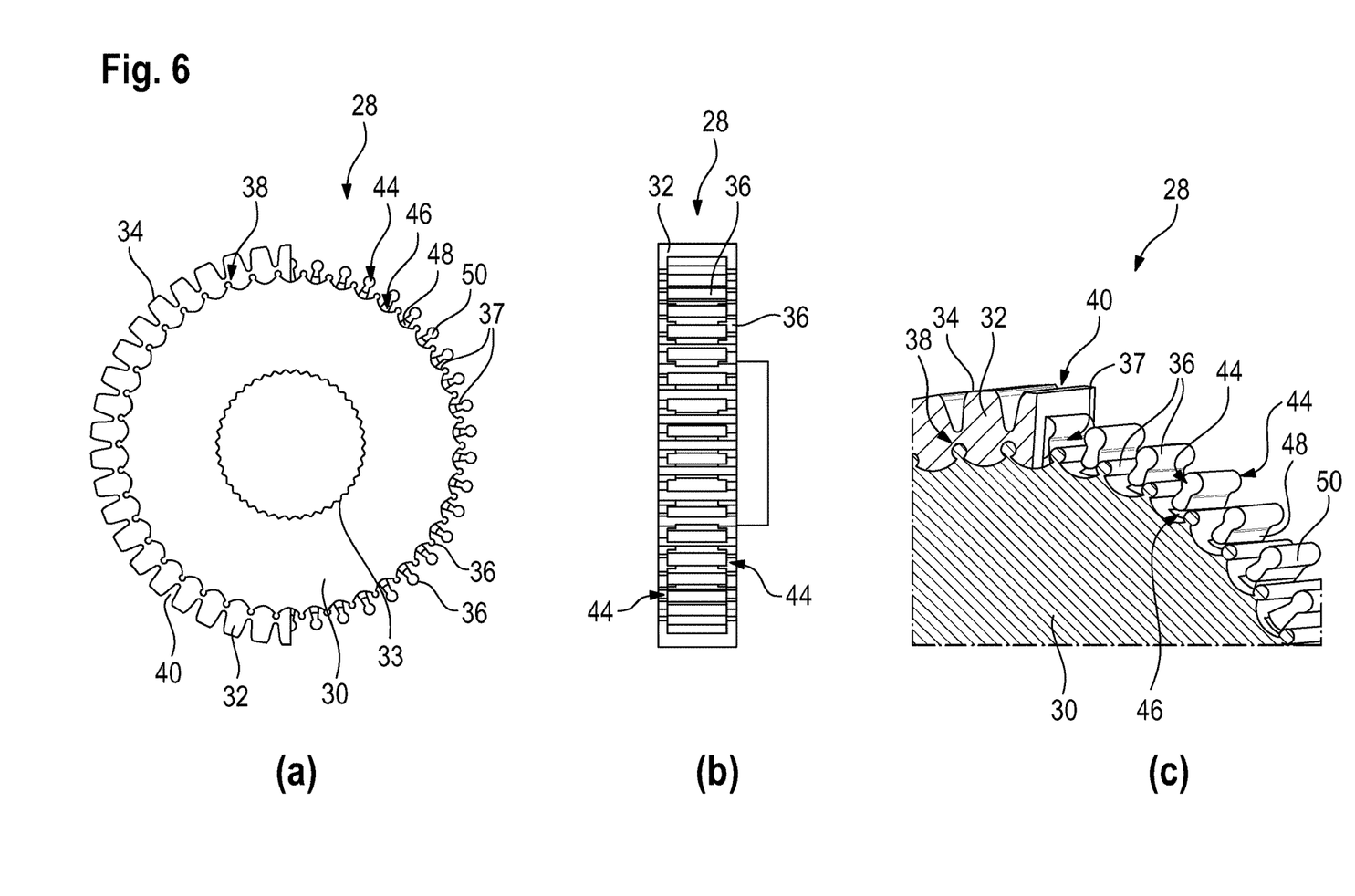
FIG. 6(a) is a front view of a gearwheel according to the present disclosure and according to a fifth embodiment.
FIG. 6(b) is a side view of a gearwheel according to the present disclosure and according to a fifth embodiment.
FIG. 6(c) is a partial, expanded view of a gearwheel according to the present disclosure and according to a fifth embodiment.

In FIGS. 6(a) to (c) is shown a fifth embodiment of the gearwheel 28 in an axial view, in a side view and in an oblique view. The embodiment shown in FIG. 6 of the gearwheel 28 differs from the embodiment shown in FIG. 5 in that the intermeshing teeth 36 that are associated with a tooth 34 have a further undercut 46. The further undercut 46 in cross-section is an undercut in the radial direction, and in longitudinal section it is an undercut in the axial direction of the gearwheel 28. In the embodiment shown, the additional undercut 46 is formed in a manner that the corresponding intermeshing teeth 36 comprise a first portion 48 and a second portion 50, wherein the first portion 48 extends from the core section 30 radially outwards, and wherein the second portion 50 connects to the first portion 48 radially outwards. The first portion 48 has a lower axial extension than the second portion, so that the undercut 46 is formed.

For example, the first portion 48 in cross-section has substantially the shape of trapezoid, tapered radially outwards. The second portion 50 has the undercut 37 of the respective intermeshing teeth 36 and may have, as described above with respect to the other embodiments, in principle, each suitable shape with an undercut 37.

In the exemplary embodiment shown in FIG. 6, the second section 50 in cross-section has a peanut shell-like shape, wherein the narrower end of the peanut shell-like shape is arranged radially closer to the core section 40.

What is claimed is:

1. A multi-piece gearwheel having an inner core section and an outer toothed ring with an external toothing, wherein the core section has opposite and spaced apart first and second axial end surfaces and an outer circumferential surface extending axially from the first axial end surface to the second axial end surface, the core section having intermeshing teeth on and extending radially outwards from the outer circumferential surface of the core section, each of the intermeshing teeth having an undercut in a radial direction, a first plurality of the intermeshing teeth extending in an axial direction on the outer circumferential surface from one of the first and second axial end surfaces toward the other of the first and second axial end surfaces, a second plurality of the intermeshing teeth being spaced axially from each of the first and second axial end surfaces and extending in the axial direction on the outer circumferential surface, the axial direction being transverse to the radial direction, wherein the toothed ring has recesses, which originate from an inner side of the toothed ring and extend radially outwards, wherein the recesses are at least partially complementary to the intermeshing teeth, and wherein the intermeshing teeth are received in the recesses.

2. The multi-piece gearwheel according to claim 1, wherein the intermeshing teeth of one of the first and second plurality of the intermeshing teeth are each arranged substantially in a circumferential direction centrally and radially inwards to an associated tooth of the toothed ring, and the intermeshing teeth of the other of the first and second plurality of the intermeshing teeth are each arranged substantially in the circumferential direction centrally and radially inwards to an associated tooth gap of the toothed ring.

3. The multi-piece gearwheel according to claim 2, wherein a number of intermeshing teeth is twice as large as a number of teeth of the external toothing.

4. The multi-piece gearwheel according to claim 2, wherein the first plurality of the intermeshing teeth and the second plurality of the intermeshing teeth extend differently in the radial direction.

5. The multi-piece gearwheel according to claim 4, wherein the first plurality of the intermeshing teeth are arranged radially inwards relative to an associated tooth gap, the second plurality of intermeshing teeth are arranged radially inwards relative to an associated tooth, and at least one of the second plurality of the intermeshing teeth extends in the radial direction into an associated tooth.

6. The multi-piece gearwheel according to claim 1, wherein a cross-section of the intermeshing teeth tapers starting from the core section first and then widens again to form the undercut, the cross-section of the intermeshing teeth being defined in a radial plane.

7. The multi-piece gearwheel according to claim 5, wherein the cross-section of the intermeshing teeth in an axial view is formed substantially by a conical trapezoid tapered radially outwards, to whose radial end an elliptical segment is connected.

8. The multi-piece gearwheel according to claim 1, wherein a plurality of rows of intermeshing teeth are provided, which are connected to each other in the axial direction of the gearwheel.

9. The multi-piece gearwheel according to claim 8, wherein a height of the radial extension of at least one of the rows differs from a height of the radial extension of the other rows.

10. The multi-piece gearwheel according to claim 9, wherein the core section has three rows of intermeshing teeth, wherein a plurality of circumferentially-spaced intermeshing teeth of a middle row, has a larger radial extension than the intermeshing teeth of the two outer rows.

11. The multi-piece gearwheel according to claim 1, wherein at least one of the intermeshing teeth has a second undercut that is in a longitudinal section and in the axial direction.

12. The multi-piece gearwheel according to claim 1, wherein the core section comprises an inner ring and an outer ring, wherein the intermeshing teeth are mounted on the outer ring, and wherein the inner and outer ring are connected to each other by struts and/or by a half-timbered construction.

13. A multi-piece gearwheel, comprising:
an outer toothed ring having recesses and external teeth; and
an inner core section having intermeshing teeth on and extending radially outwards from an outer circumferential surface of the core section, the intermeshing teeth extending in a radial direction into the recesses, at least one of the intermeshing teeth having an indentation in a circumferential direction that forms an undercut between two radially adjacent portions of the at least one of the intermeshing teeth, a first plurality of the intermeshing teeth extending further in the radial direction than a second plurality of the intermeshing teeth, one of the first and second plurality of the intermeshing teeth having a length in an axial direction that is less than a length of the outer circumferential surface of the core section in the axial direction, and the other of the first and second plurality of the intermeshing teeth having a length in the axial direction that is equal to the length of the outer circumferential surface of the core section in the axial direction, the axial direction being transverse to the radial direction.

14. The multi-piece gearwheel according to claim 13, wherein the outer toothed ring has a plurality of tooth gaps, each tooth gap being between two circumferentially adjacent external teeth, each intermeshing tooth of the first plurality of intermeshing teeth being circumferentially aligned with and extending in the radial direction into an associated external tooth of the outer toothed ring, each intermeshing tooth of the second plurality of intermeshing teeth being circumferentially aligned with and extending in the radial direction toward an associated tooth gap of the outer toothed ring.

15. The multi-piece gearwheel according to claim 13, wherein the intermeshing teeth outnumber the external teeth by a margin of 2 to 1.

16. The multi-piece gearwheel according to claim 13, wherein a circumferential width of each intermeshing tooth inwardly tapers starting from the inner core section first and then widens again to form the undercut.

17. The multi-piece gearwheel according to claim 13, wherein a plurality of rows of the intermeshing teeth are provided, which are connected to each other in an axial direction of the gearwheel.

18. The multi-piece gearwheel according to claim 13, wherein the core section has transmission teeth that are free from undercuts.

19. The multi-piece gearwheel according to claim 18, wherein the transmission teeth alternate with the intermeshing teeth in the circumferential direction, or that groups of transmission teeth alternate with groups of intermeshing teeth.

\* \* \* \* \*